United States Patent Office 3,316,996
Patented May 2, 1967

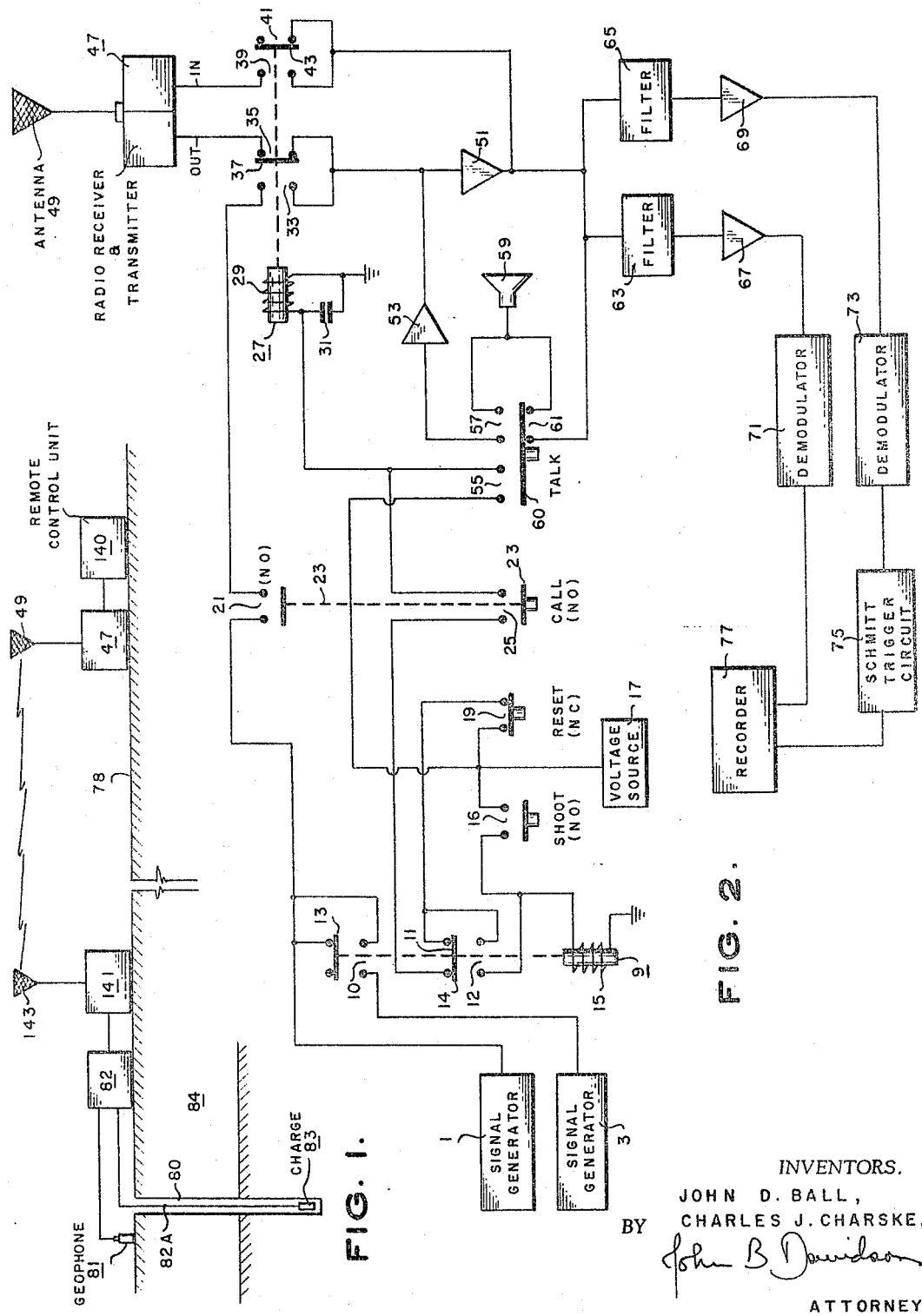

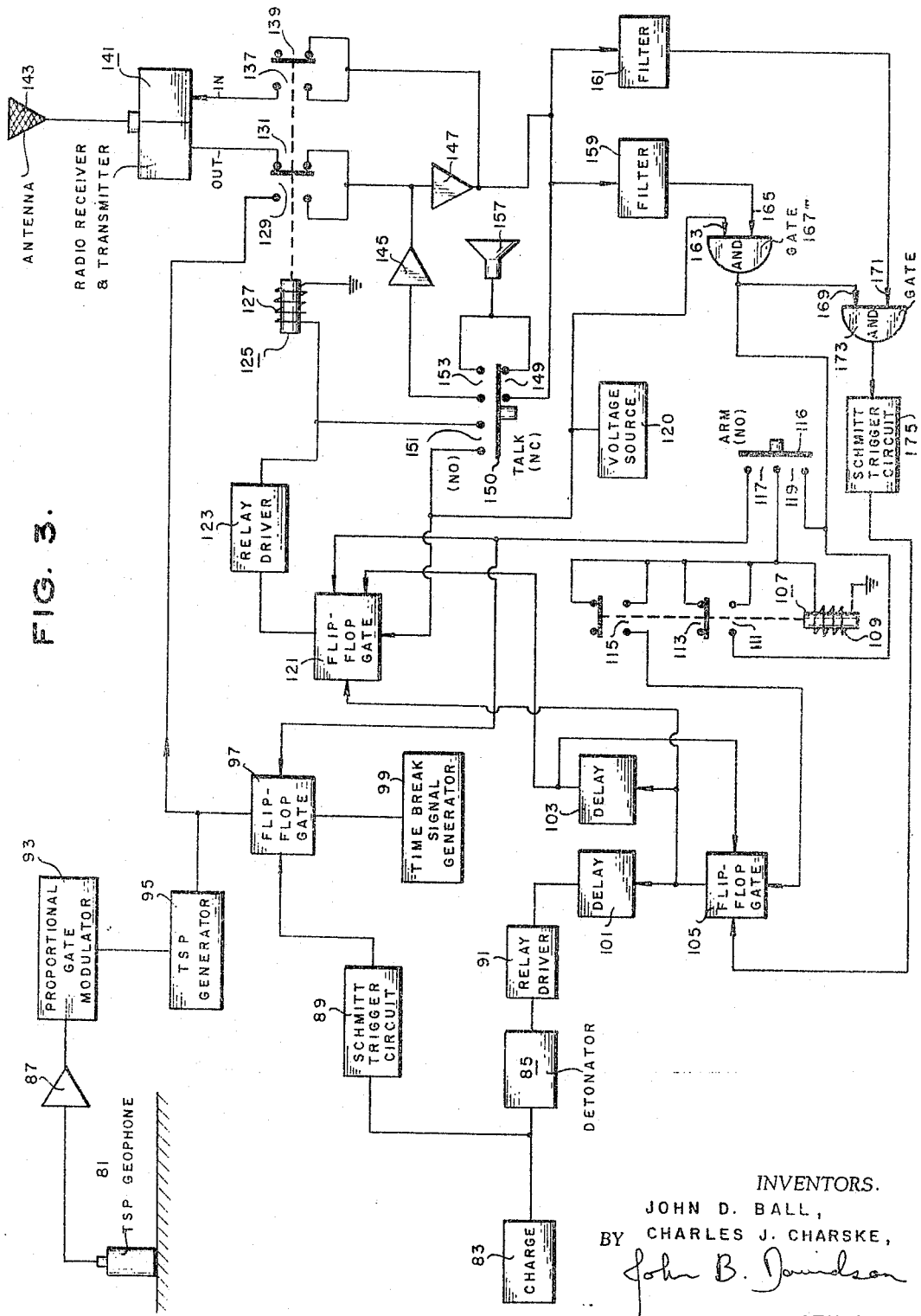

3,316,996
SEISMIC SYSTEM WITH A RADIO COMMUNICATIONS LINK CONNECTING THE RECORDING AND SHOT STATIONS
John D. Ball and Charles J. Charske, Houston, Tex., assignors, by mesne assignments, to Esso Production Research Company, Houston, Tex., a corporation of Delaware
Filed Dec. 7, 1964, Ser. No. 416,325
2 Claims. (Cl. 181—.5)

This invention relates generally to seismic prospecting, and more particularly to apparatus for controlling seismic prospecting operations from a single operating position.

The general method of geophysical prospecting utilizing seismic waves is well known. Briefly stated, the method comprises the steps of initiating a seismic impulse at or near the surface of the earth, and recording signals generated by geophones as the result of earth movement at one or more points more or less spaced from the point of origin of the impulse. The recordation must permit measurement of the time elapsing between the instant of the origination of the impulse and the generation of signals as a result of subsequent earth movement. The original impulse will set up elastic waves that are transmitted through the earth. Any discontinuity or variation of structure within the earth will reflect and/or refract a portion of the energy in the waves so that a recording of the signals from the receiving points will comprise a number of arriving waves, each derived from the original impulse and each differing from the others in time of arrival, magnitude, and wave shape, or all three.

When explosive charges are used as the source of energy for the impulse, it is customary to explode the charge at or near the bottom of a shot hole drilled through the weathered layer of the earth's surface. In order to accurately determine the depth of subsurface interfaces, it is necessary to know the travel time of seismic waves through the weathered layer. For this reason a separate geophone (termed the TSP geophone) is positioned near the opening of the shot hole at the earth's surface for the specific purpose of detecting first arrivals so that the travel time of seismic waves traveling substantially vertically from the explosive charge through the weathered layer can be measured.

It is also necessary to correlate the operation of the seismic wave recorder with the detonation of the seismic charge. To this end it is customary to detonate the seismic charge by means of an electric circuit including a cam actuated switch on the recorder, to produce an impulse indicative of the "break time" or instant at which the seismic charge is detonated, and to record this impulse. The customary means for conveying electrical signals back and forth between the recording location and the shot hole has been by means of electrical cables. Manifestly, when it is necessary to position the recording truck at a considerable distance from a shot hole, the use of cables is most inconvenient and costly. It is desirable to use a wireless communications link, such as a radio link, for this purpose.

If an unlimited number of frequencies were available for the purpose of establishing such a communications link, and if an unlimited amount of equipment could be used for this purpose, the use of such a communications link would be relatively simple from an engineering viewpoint. However, such is not the case. Usually, only one or two communications frequencies are available, and a recording truck can accommodate only a limited amount of communications equipment. Therefore, if a communications link is to be used for the purpose of transmitting information back and forth between a recording truck location and a shot hole location, only one transmitter and one receiver can be used at each location to control the firing of a seismic charge and to transmit a break pulse and the output signal of the TSP geophone to the remote location whereat the recording truck is stationed.

Objects and features of the invention not apparent from the above discussion will become evident upon consideration of the following description of the invention taken in connection with the accompanying drawings, wherein:

FIG. 1 is an elemental schematic diagram of apparatus for making a seismic observation in accordance with the invention;

FIG. 2 is a more detailed electrical schematic diagram of apparatus for use at the remote control location illustrated in FIG. 1; and FIG. 3 is a more detailed electrical schematic diagram of apparatus for use at the shot hole location as illustrated in FIG. 1.

With reference now to FIG. 1, there is illustrated a shot hole 80 drilled in the earth from the earth's surface 78 to a location below the weathered layer 84 of the earth. An explosive charge 83 at the bottom of shot hole 80 is for the purpose of producing a seismic impulse when it is detonated. The detonation of the seismic charge 83 is controlled by control apparatus 82 connected to the charge by electrical lead 82A. A radio receiver and transmitter unit 141 having an antenna 143 is electrically connected to the control apparatus 82 for controlling the operation thereof in accordance with radio signals received thereby and for transmitting information from control unit 82 to a remote location by means of radio signals. A TSP geophone 81 also is connected to control apparatus 82. The signals from geophone 81 are used to modulate the signal transmitted to a remote location by unit 141.

At a remote location from the shot hole 80 there is illustrated a remote control unit 140 connected to a radio transmitter and receiver 47 having an antenna 49. The frequency of operation of the radio units 47 and 141 are assumed to be such that the receiver of unit 47 is tuned to the transmitting frequency of unit 141, and that the receiver of unit 141 is tuned to the transmitting frequency of unit 47. Preferably, only one frequency is used by the transmitting sections of radio units 47 and 141, although it is to be understood that two frequencies may be used if such is feasible and desirable.

The remote control unit 140 is used to produce signals which may be termed arming signals and firing signals for the control of control unit 82. The arming signals warn an operator at the shot hole location that the remote control operator is ready to initiate a seismic impulse. The shot hole operator closes a manually actuatable switch in control unit 82 when the seismic charge 83 is ready to be fired and all operating personnel are at a safe distance from the shot hole. The remote control operator thereupon closes the switch in unit 140 which initiates the firing signal. The firing signal is transmitted to the shot hole location simultaneously with the arming signal so that when both signals are concomitantly received by control unit 82, a timing operation is initiated, causing explosive charge 83 to be detonated. A time break signal occurs at the time of detonation of charge 83 and is produced in control unit 82. Concurrent with the start of the timing operation, radio unit 141 switches from the receive mode to the transmit mode thereof, and the radio unit 47 switches from the transmit mode to the receive mode thereof so that the time break signal is transmitted from the shot hole location to the remote location whereat it is received and recorded on a conventional seismic recorder. The transmission process from radio 141 continues for approximately one-half second after the charge has been detonated, at which time control unit 82 causes radio 141 to return to the receive mode. Both radios will then remain in the receive mode until a new transmission is initiated by one of the operators.

The operation of the apparatus of the control units of FIGS. 2 and 3 will be best understood by a description of an operating cycle thereof. Initially, voice communication between the operators at the remote location and the shot hole location is initiated so that the shot hole operator will know that it is desirable to initiate a seismic observation in the immediate future. Voice communication from the remote location is effected by pressing push-button switch 60 so that speaker-microphone 59 is connected to the modulator of the transmitter unit of radio unit 47 through normally open contact 57, amplifiers 53 and 51, and the normally open contact 39 of switch 43. Referring now to FIG. 3, the operator at the shot hole location may press push-button 150 to close switches 153. Switch contact 151 connects source 120 to relay coil 127 of relay 125 which closes contacts 137 so that the transmitter-modulator of radio unit 141 is driven from speaker-microphone 157 through amplifiers 145 and 147. When push-button 60 is released, the radio transmitter and receiver 47 returns to the receive condition.

When the operator at the remote control location has determined that the shot hole operator is ready to allow the shot to be safely detonated, he presses push-button switch 23 to close normally open contacts 21 and 25. Closure of contact 25 energizes winding 29 of relay 27 to pick up the relay and close contacts 33 and 39. Closure of contact 21 permits the output of signal generator 1 to drive the modulator of the radio transmitter of unit 47 through contacts 33 and 39 and amplifier 51. The radio frequency signal produced thereby will be received by radio unit 141, will be demodulated thereby, and the output signal of the receiver thereof will be applied through switch 131 to amplifier 147 and will be reproduced by the speaker-microphone 157. The signal also will be filtered by filter 159 and will be applied to AND circuit 167. The AND circuit 167 also has applied thereto the voltage from source 120. When the output signal of filter 159 is applied to AND circuit 167, the voltage of source 120 will appear at the output of the AND circuit. The shot hole operator, upon hearing the output signal of signal generator 1 in speaker-microphone 157, will press push-button 116 to close contacts 117 and 119 and energize winding 109 of relay 107. This relay will pick up to close contacts 115 and 111. The output signal from AND circuit 167 will be applied to winding 109 even though the shot hole operator releases push-button switch 116 so that the relay 107 will remain picked up as long as a signal is applied to the AND circuit 167.

The remote control operator thereupon closes switch 16 to energize the winding 15 of relay 9 to close contacts 10 and 12 and to open contact 11 when relay 9 is picked up. The opening of contact 11 will remove the energizing current source from winding 29 of relay 27. However, capacitor 31 connected across the winding 29 will cause the relay 27 to remain picked up for a brief interval of time sufficient to allow a burst of output signal from signal generator 3 to be applied to the transmitter-modulator of radio unit 47 through contacts 10, 21, 33, and 39 and through amplifier 51. The transmitted signals from radio 47 are received by radio 141 and the signal from signal generator 3 will be applied to input circuit 171 of AND circuit 173 through contacts 131, amplifier 147, and filter 161. (It should be noted that filters 159 and 161 respectively discriminate against the output signals of signal generators 3 and 1 so that filter 159 passes only the output of signal generator 1, and filter 161 passes only the output of signal generator 3.) The output signal of AND circuit 167 is also present at the input circuit 169 of AND circuit 173 so that the output voltage of source 120 appears at the output of AND circuit 173 upon application thereto of a signal from filter 161. The output voltage of source 120 also is applied to gate 105 through contacts 111 and 115 of relay 107. When AND circuit 173 produces an output signal, Schmitt trigger circuit 175 is actuated to pulse the gating circuit 105 so that the voltage applied from source 120 appears at the output of the gate. This signal is delayed approximately one-half second by delay circuit 101, whereup it is applied to relay driver 91 to drive a relay or other explosive charge actuating device for detonating explosive charge 83. A secondary output of the explosive charge detonating device 85 is used to initiate a time break signal which is applied to Schmitt trigger circuit 89. The output of a time break signal generator 99 is applied to a gating circuit 97 which is triggered by Schmitt trigger circuit 89 so that the signal from signal generator 99 appears at the output thereof.

Concomitantly with the application of the output signal from gating circuit 105 to delay circuit 101, gate 121 is triggered so that the voltage from source 120 is applied to relay driver 123 to pick up relay 125 by energizing winding 127. Contacts 129 and 137 are closed so that the signal from time break signal generator 99 is applied to the transmitter-modulator of radio unit 141 via amplifier 147. At the same time, the output signal from TSP geophone 81 is applied to a proportional gate modulator 93 to modulate a TSP generator 95. (It should be noted that TSP generator 95 and signal generators 1, 3, and 99 all produce audio frequency signals of different frequencies.) The modulated output signal from signal generator 95 also is applied to the transmitter-modulator of radio unit 141 and is transmitted thereby to the remote location. Inasmuch as the radio unit 47 is in the receive mode, the output signals of the receiver thereof are applied to filters 63 and 65 through amplifier 51. Filter 63 discriminates against the output signal of generator 99 and passes the output signal of generator 95. Filter 65 discriminates against the output signal of signal generator 95 but passes the output signal of signal generator 99. The filtered signals are respectively amplified by amplifiers 67 and 69 and demodulated by demodulators 71 and 73. The output signal of demodulator 73 abruptly changes state at the instant the time break pulse is applied to Schmitt trigger 89, whereas the output of demodulaor 71 is a reconstruction of the output of geophone 81. The output signal of the demodulator 73 may be applied to a Schmitt trigger 75 so that the signal produced by the time break pulse triggers the Schmitt trigger 75. The output signals of Schmitt trigger circuit 75 and demodulator 71 are recorded as separate traces on a conventional seismic recorder 77.

After an interval of one second from production of an output signal by gate 105, delay device 103 will produce an output signal which is used to reset gates 105 and 121. Relay 125 will drop out to open contacts 129 and 137 and close contact 131. This will switch the radio unit 141 to the receive mode thereof. Radio unit 47 has been previously returned to the receive mode thereof as described above and will remain in this mode until the operator initiates a new transmission. Another automatic shooting sequence cannot begin until after the operator manually operates reset push-button 19. Reset push-button 19 is momentarily opened to disconnect voltage source 17 from relay winding 15 so that relay 9 drops out to open contacts 10 and 12 and close contact 11.

The invention is not necessarily to be restricted to the specific structural details, arrangement of parts, or circuit connections herein set forth, as various modifications thereof may be effected without departing from the spirit and scope of the invention.

What is claimed is:

1. In seismic prospecting wherein an explosive charge is detonated in a shot hole and resulting seismic waves are detected by a plurality of geophones including a given geophone stationed at the mouth of the shot hole, apparatus for controlling the detonation of the explosive charge from a remote location from the shot hole and for measuring the travel time of seismic waves to said given geophone, comprising:

first and second signal generating means at said remote location for producing electrical signals of different frequency;

a communications link between said remote and shot hole locations;

means for selectively connecting said first and second signal generating means to said communications link for transmitting the signals produced thereby to said shot hole location;

means at said shot hole location connected to said communications link to provide a sensible indication of the output signal of said first signal generating means;

detonating means at said shot hole location for detonating an explosive charge responsive to a detonating signal applied thereto;

gating means for gating a detonating signal to said detonating means responsive to a firing signal applied thereto;

first circuit means connected to said communications link for producing said detonating signal responsive to reception of the output signal of said first signal generating means thereby; manually actuatable means connected to said gating means and to said first circuit means for conducting the detonating signal of said first circuit means to said gating means upon manual actuation thereof; and second circuit means connected to said communications link, to said gating means, and to said first circuit means, responsive to simultaneous reception thereby of the output signal of said second signal generating means and the detonating signal from said first circuit means to produce said firing signal for said gating means.

2. In seismic prospecting wherein an explosive charge is detonated in a shot hole and resulting seismic waves are detected by a plurality of geophones including a given geophone stationed at the mouth of the shot hole, apparatus for controlling the detonation of the explosive charge from a remote location from the shot hole and for measuring the travel time of seismic waves to said given geophone, comprising:

first and second signal generating means at said remote location for producing electrical signals of different frequency;

a communications link between said remote and shot hole locations;

means at said shot hole location connected to said communications link to provide a sensible indication of the output signal of said first signal generating means;

means for selectively connecting said first and second signal generating means to said communications link for transmitting the signals produced thereby to said shot hole location;

detonating means at said shot hole location for detonating an explosive charge responsive to a detonating signal applied thereto;

gating means for gating a detonating signal to said detonating means responsive to a firing signal applied thereto;

first circuit means connected to said communications link for producing said detonating signal responsive to reception of the output signal of said first signal generating means thereby;

manually actuatable means connected to said first circuit means and to said gating means for conducting the detonating signal of said first circuit means to said gating means upon manual actuation thereof;

second circuit means connected to said communications link, to said gating means, and to said first circuit means, responsive to simultaneous reception thereby of the output signal of said second signal generating means and the detonating signal from said first circuit means to produce said firing signal for said gating means;

third circuit means connected to said detonating means for producing a time break signal at the instant of explosive charge detonation by said detonating means;

third signal generating means at said shot hole location connected to said communications link;

means for connection to said given geophone and connected to said third signal generating means for modulating the output signal of said third signal generating means in accordance with the output signals of said given geophone;

means connected to said gating means for connecting the output signals of said third circuit means and said third signal generating means to said communications link responsive to the output signal of said gating means; and means at said remote location connected to said communications link for separately recording as a time function the components of the signal received thereby produced by the third signal generating means by said third circuit means.

References Cited by the Examiner

UNITED STATES PATENTS

| | | | |
|---|---|---|---|
| 3,062,315 | 11/1962 | Herzog | 181—0.5 |
| 3,220,503 | 11/1965 | Oakley | 181—0.5 |
| 3,225,858 | 12/1965 | Pfab | 181—0.5 |

BENJAMIN A. BORCHELT, *Primary Examiner.*

SAMUEL FEINBERG, *Examiner.*

M. F. HUBLER, *Assistant Examiner.*